United States Patent
Haijima et al.

(10) Patent No.: US 8,321,167 B2
(45) Date of Patent: Nov. 27, 2012

(54) SURVEYING INSTRUMENT AND SURVEYING COMPENSATION METHOD

(75) Inventors: Yasuhito Haijima, Itabashi-ku (JP); Kaoru Kumagai, Itabashi-ku (JP)

(73) Assignee: Kabushiki Kaisha TOPCON, Tokyo-To (JP)

( * ) Notice: Subject to any disclaimer, the term of this patent is extended or adjusted under 35 U.S.C. 154(b) by 689 days.

(21) Appl. No.: 12/317,501

(22) Filed: Dec. 24, 2008

(65) Prior Publication Data

US 2009/0171610 A1 Jul. 2, 2009

(30) Foreign Application Priority Data

Dec. 27, 2007 (JP) ................................. 2007-337110

(51) Int. Cl.
*G06F 19/00* (2006.01)

(52) U.S. Cl. .............. 702/94; 33/227; 33/290; 250/236; 250/559.3

(58) Field of Classification Search .................... 702/94, 702/150–154, 158, 159; 250/236, 559.3; 356/401; 33/227, 290
See application file for complete search history.

(56) References Cited

U.S. PATENT DOCUMENTS

| 5,894,123 A | * | 4/1999 | Ohtomo et al. | 250/236 |
| 7,075,634 B2 | * | 7/2006 | Uezono et al. | 356/139.1 |
| 2005/0172503 A1 | | 8/2005 | Kumagai et al. | |

FOREIGN PATENT DOCUMENTS

| JP | 2002-168625 A | 6/2002 |
| JP | 2003-185436 | 7/2003 |
| JP | 2004-93504 A | 3/2004 |
| JP | 2007-127628 | 5/2007 |

OTHER PUBLICATIONS

Japanese Communication, with English translation, mailed Aug. 7, 2012 in corresponding Japanese patent application No. JP 2007-337110.

* cited by examiner

*Primary Examiner* — Jonathan C Teixeira Moffat
*Assistant Examiner* — Hien Vo
(74) *Attorney, Agent, or Firm* — Nields, Lemack & Frame, LLC (57) ABSTRACT

The present invention provides a surveying instrument, which comprises rotating units operated rotatably, supporting units to support the rotating units, a reflection mirror portion provided on one of the supporting unit or the rotating unit, tilt sensors arranged on the other of the supporting unit and the rotating unit and for projecting a detecting light and for detecting a relative tilting of the reflection surface of the reflection mirror portion with respect to the supporting unit by receiving the detecting light reflected by the reflection mirror portion, and a control unit for calculating an unsteadiness of rotation of the rotating unit based on a signal from the tilt sensor.

11 Claims, 7 Drawing Sheets

SURVEYING INSTRUMENT AND SURVEYING COMPENSATION METHOD

BACKGROUND OF THE INVENTION

The present invention relates to a surveying instrument with a rotating unit, e.g. a surveying instrument with a tracking function and with a distance measuring optical system accommodated in the rotating unit. The invention also relates to a surveying compensation method on this type of surveying instrument.

A surveying instrument with the tracking function performs surveying of a measuring point by tracking an object to be measured such as a reflection mirror. By this type of surveying instrument, a surveying operation can be carried out even when a surveying operator is not assigned at a side where the surveying instrument is installed.

In this type of surveying instrument, an optical axis of a distance measuring optical system (i.e. a distance measuring light optical axis) is rotated in a horizontal direction and the optical axis of the distance measuring optical system can be rotated in a vertical (high-low) direction, so that the optical axis of the distance measuring optical system is always directed toward the object to be measured. An horizontal angle and an elevation angle of the distance measuring light optical axis are detected by an angle detector. A distance to the object to be measured is measured, and a horizontal angle and an elevation angle of the object to be measured is measured.

In general, in order that a rotating unit can be rotated, there must be a gap between a rotation shaft and a bearing unit. The rotating unit has an eccentricity, an unsteadiness of rotation, etc. caused by error in the manufacturing process. Because of the gap, the eccentricity, the unsteadiness of rotation, etc., a deviation occurs on the distance measuring light optical axis during rotation. Such type of deviation on the distance measuring light optical axis appears as an error of a horizontal angle or an elevation angle. For the purpose of improving the measurement accuracy, it is necessary to eliminate the influence of the deviation on the distance measuring light optical axis.

In addition to the error caused by the rotating unit, there is a case where an error is caused by the angle detector itself. In order to perform measurement with high accuracy, it is necessary to compensate the error of the angle detector.

A surveying instrument, which is capable to compensate the deviation on the distance measuring light optical axis during the rotation is disclosed in JP-A-2003-185436.

According to the Patent Publication of JP-A-2003-185436, an encoder plate (a disk where a pattern for an angle detection is formed) rotated in a horizontal direction is used as a reflection mirror. A first detecting light is projected to the encoder plate, and the first detecting light reflected from the encoder plate is received at a photodetector. Then, a second detecting light is projected to a free liquid surface, and the second detecting light reflected from the free liquid surface is received by the same photodetector. From a deviation of a photodetecting position on the photodetector, a tilting of the encoder plate with respect to the free liquid surface, i.e. a deviation of the distance measuring light optical axis, is detected, and a measured value is compensated based on a result of detection.

The invention disclosed in JP-A-2003-185436 is based on an assumption that the encoder plate is mounted in a perpendicular direction with respect to a rotation shaft, and that an undulation or the like does not exist on the encoder plate itself, or on the reflection surface. In fact, however, the encoder plate may not be in the perpendicular direction with respect to the rotation shaft due to the error at the time of mounting, or the undulation or the like may be present on the reflection surface. In such case, a deviation of the photodetecting position on the photodetector does not accurately reflect a deviation of the distance measuring light optical axis. In such case, the compensation cannot be performed with high accuracy.

SUMMARY OF THE INVENTION

An object of an embodiment of the present invention is to accurately detect a deviation of a rotation shaft caused by rotation of a rotating unit of the surveying instrument or a deviation of the distance measuring light optical axis, to improve the accuracy of the compensation, and to increase the measurement accuracy.

To attain the above object, the surveying instrument according to the present invention comprises rotating unit operated rotatably, supporting unit to support the rotating unit, a reflection mirror portion provided on one of the supporting unit or the rotating unit, tilt sensor arranged on the other of the supporting unit and the rotating unit and for projecting a detecting light and for detecting a relative tilting of reflection surface of the reflection mirror portion with respect to the supporting unit by receiving the detecting light reflected by the reflection mirror portion, and a control unit for calculating the unsteadiness of rotation of the rotating unit based on a signal from the tilt sensor.

Also, the present invention provides a surveying instrument, wherein the control unit has a storage unit where data of the undulation of the reflection surface of the reflection mirror portion measured in advance is stored, and the control unit removes the undulation of the reflection surface according to signals from the tilt sensor and calculates the unsteadiness of rotation of the rotating unit. Further, the present invention provides a surveying instrument, wherein there is provided an encoder for detecting a relative rotation angle between the rotating unit and the supporting unit, and the control unit compensates the angle measured by the encoder based on the unsteadiness of rotation obtained by a calculation. Also, the present invention provides a surveying instrument, wherein the rotating unit comprises a vertical shaft, a horizontal rotating unit rotating around the vertical shaft, a horizontal shaft, and a vertical rotating unit rotating around the horizontal shaft, wherein the tilt sensor has a horizontal tilt sensor for detecting the unsteadiness of rotation of the horizontal rotating unit and a vertical tilt sensor for detecting the unsteadiness of rotation of the vertical rotating unit. Further, the present invention provides a surveying instrument, wherein the rotating unit is a body tube unit for accommodating a distance measuring unit, and the control unit performs the calculation to compensate at least one of horizontal distance and vertical distance based on the unsteadiness of rotation obtained by the calculation and based on the value of a distance measurement measured by the distance measuring unit. Also, the present invention provides a surveying instrument, wherein the reflection mirror portion is disposed on a rotation center line of the rotating unit. Further, the present invention provides a surveying instrument, wherein the reflection mirror portion is designed in a ring-like shape and is disposed concentrically with the rotation center line of the rotating unit. Also, the present invention provides a surveying instrument, wherein the reflection mirror portion is formed in the ring-like shape on an encoder plate of an encoder.

Further, the present invention provides a surveying compensation method in a surveying instrument, the surveying instrument comprises rotating unit operated rotatably, a distance measuring unit accommodated in the rotating unit, an angle detector for detection an angle of the rotating unit, supporting unit to support the rotating unit, a reflection mirror portion provided on one of the supporting unit or the rotating unit, tilt sensor arranged on the other of the supporting unit and the rotating unit and for projecting a detecting light and for detecting the relative tilting of reflection surface of the reflection mirror portion with respect to the supporting unit by receiving the detecting light reflected by the reflection mirror portion, wherein the surveying compensation method comprises steps of: a step of measuring the undulation of the reflection surface by the reflection mirror portion itself; a step of detecting the tilting of the reflection surface of the reflection mirror portion under the condition that the tilt sensor is mounted on the supporting unit; a step of calculating the unsteadiness of the rotation by removing the undulation of the reflection surface from the tilting of the reflection surface; and a step of compensating at least one of a rotation angle of the rotating unit measured based on the undulation and the unsteadiness of rotation, or further, three-dimensional coordinates calculated from the value of the rotation angle and the result of the distance measurement obtained at the distance measuring unit.

The present invention provides a surveying instrument, which comprises rotating unit operated rotatably, supporting unit to support the rotating unit, a reflection mirror portion provided on one of the supporting unit or the rotating unit, tilt sensor arranged on the other of the supporting unit and the rotating unit and for projecting a detecting light and for detecting the relative tilting of reflection surface of the reflection mirror portion with respect to the supporting unit by receiving the detecting light reflected by the reflection mirror portion, and a control unit for calculating the unsteadiness of rotation of the rotating unit based on a signal from the tilt sensor. As a result, it is possible to calculate the unsteadiness of rotation of the rotating unit no matter whatever the installation condition of the surveying instrument may be.

Also, the present invention provides a surveying instrument, wherein the control unit has a storage unit where data of the undulation of the reflection surface of the reflection mirror portion measured in advance is stored, and the control unit removes the undulation of the reflection surface according to signals from the tilt sensor and calculates the unsteadiness of rotation of the rotating unit. As a result, it is possible to compensate the error caused by the undulation of the reflection surface, which cannot be obtained merely by the detection result from the tilt sensor, and also to improve the compensation accuracy.

Further, the present invention provides a surveying instrument, wherein there is provided an encoder for detecting the relative rotation angle between the rotating unit and the supporting unit, and the control unit compensates the angle measured by the encoder based on the unsteadiness of rotation obtained by calculation. As a result, it is possible to compensate the error caused by the undulation of the reflection surface, which cannot be obtained merely by the detection result from the tilt sensor, and to improve the compensation accuracy.

Also, the present invention provides a surveying instrument, wherein the rotating unit comprises a vertical shaft, a horizontal rotating unit rotating around the vertical shaft, a horizontal shaft, and a vertical rotating unit rotating around the horizontal shaft, wherein the tilt sensor has a horizontal tilt sensor for detecting the unsteadiness of rotation of the horizontal rotating unit and a vertical tilt sensor for detecting the unsteadiness of rotation of the vertical rotating unit. As a result, the unsteadiness of rotation in two directions, i.e. in the direction of the vertical shaft and in the direction of the horizontal shaft, can be compensated, and the compensation accuracy is improved.

Further, the present invention provides a surveying instrument, wherein the rotating unit is a body tube unit for accommodating a distance measuring unit, and the control unit performs the calculation to compensate at least one of horizontal distance and vertical distance based on the unsteadiness of rotation obtained by the calculation and based on the value of the distance measurement measured by the distance measuring unit. As a result, the accuracy of the distance measurement is improved.

Also, the present invention provides a surveying compensation method in a surveying instrument, the surveying instrument comprises rotating unit operated rotatably, a distance measuring unit accommodated in the rotating unit, an angle detector for detection an angle of the rotating unit, supporting unit to support the rotating unit, a reflection mirror portion provided on one of the supporting unit or the rotating unit, tilt sensor arranged on the other of the supporting unit and the rotating unit and for projecting a detecting light and for detecting the relative tilting of reflection surface of the reflection mirror portion with respect to the supporting unit by receiving the detecting light reflected by the reflection mirror portion, wherein the surveying compensation method comprises steps of: a step of measuring the undulation of the reflection surface by the reflection mirror portion itself; a step of detecting the tilting of the reflection surface of the reflection mirror portion under the condition that the tilt sensor is mounted on the supporting unit; a step of calculating the unsteadiness of rotation by removing the undulation of the reflection surface from the tilting of the reflection surface; and a step of compensating at least one of the rotation angle of the rotating unit measured based on the undulation and the unsteadiness of rotation, or further, three-dimensional coordinates calculated from the value of the rotation angle and the result of the distance measurement obtained at the distance measuring unit. As a result, it is possible to compensate even an error caused by the undulation of the reflection surface, which cannot be obtained merely by the detection result from the tilt sensor. To improve the compensation accuracy and to improve the angle measurement accuracy and the distance measurement accuracy.

BRIEF DESCRIPTION OF THE DRAWINGS

FIG. 6(A) and FIG. 6(B) represents drawings to show a relation between a rotation angle and a deviation δ caused by mirror surface irregularities detected by the horizontal tilt sensor and the elevation tilt sensor.

DETAILED DESCRIPTION OF THE PREFERRED EMBODIMENTS

A detailed description will be given below on the best mode for carrying out the present invention by referring to the attached drawings.

Figure 1:
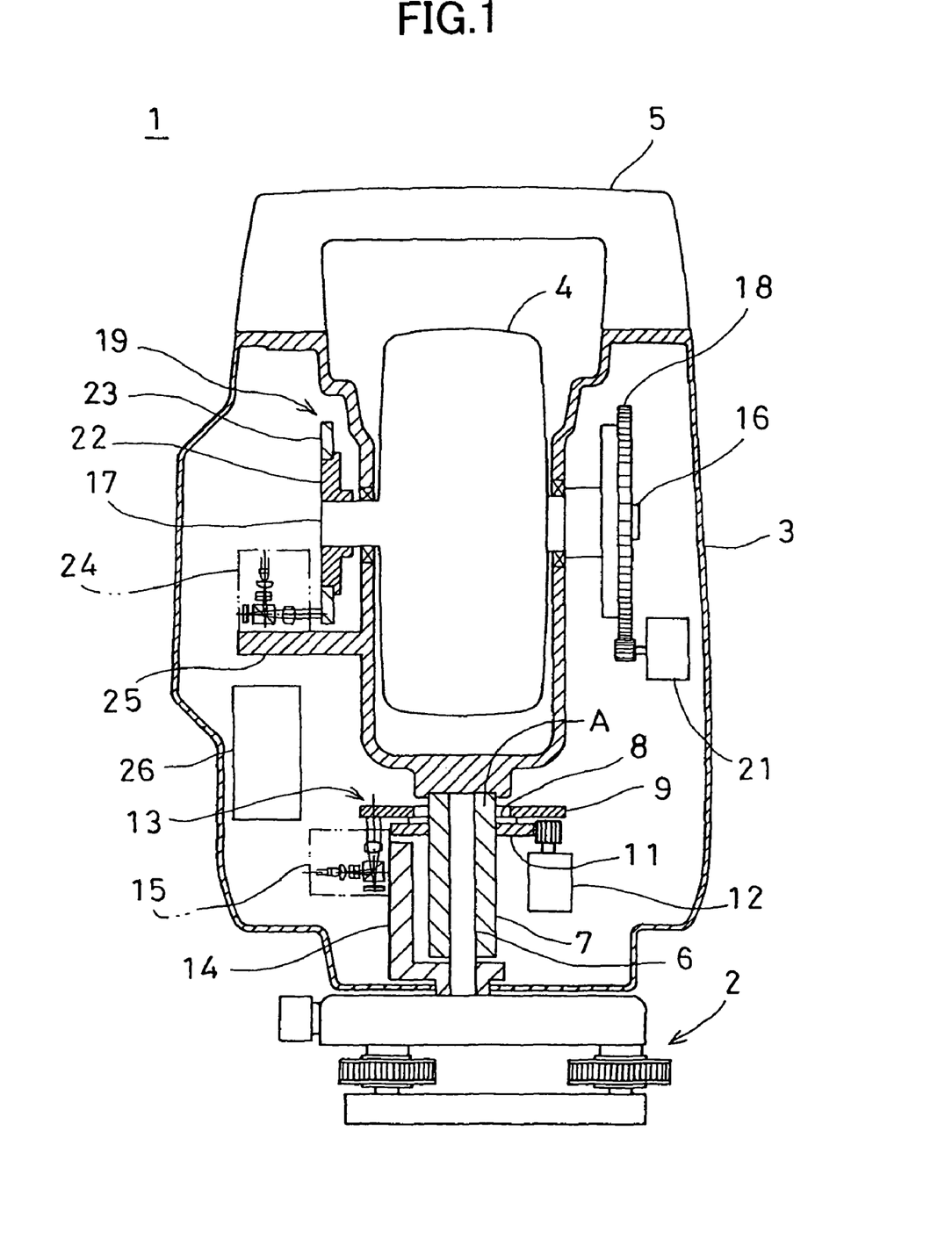
FIG. 1 is a cross-sectional view to show an embodiment of the present invention.

FIG. 1 shows an example of a surveying instrument according to the present invention and a cross-sectional view to show an essential portion of the present invention.

In the figure, a reference numeral 1 denotes a surveying instrument main unit. The surveying instrument main unit 1 comprises a leveling unit 2, a frame unit 3, a body tube unit 4, and a handle 5. The leveling unit 2 is fixed on a tripod (not shown) installed at a known point. The frame unit 3 is mounted on the leveling unit 2 so that the frame unit 3 can be rotated in a horizontal direction around a vertical axis as the center. The body tube unit 4 is rotatably mounted on the frame unit 3 around the horizontal axis as the center. The handle 5 is mounted to stretch over upper ends of the frame unit 3.

The frame unit 3 is designed with its external form in approximately in U-shape. A tilt sensor (not shown) is provided inside. Based on the result of the detection by the tilt sensor, the leveling unit 2 is adjusted so that the surveying instrument main unit 1 is leveled to have a horizontal posture.

A vertical shaft 6 is extended in an upward direction from the leveling unit 2. The vertical shaft 6 penetrates through a bottom portion of the frame unit 3. A horizontal rotation shaft 7 is rotatably engaged with the vertical shaft 6, and the frame unit 3 is fixed on an upper end of the horizontal rotation shaft 7. On the upper end portion of the horizontal rotation shaft 7, a flange 8 is formed. A horizontal angle encoder plate 9 is mounted concentrically with the horizontal rotation shaft 7 on the flange 8.

On the horizontal rotation shaft 7, a horizontal driven gear 11 is engaged. It is so designed that, when the horizontal driven gear is rotated by a horizontal angle motor 12, the frame unit 3 is rotated in horizontal direction around the vertical shaft 6.

An encoder sensor (not shown) is disposed at a position to face to the horizontal angle encoder plate 9. The encoder sensor and the horizontal angle encoder plate 9 make up together a horizontal angle encoder 13. A peripheral portion of a bottom surface of the horizontal angle encoder plate 9 is designed to have a mirror surface, and it serves as a reflection mirror portion.

The vertical shaft 6 is a supporting unit to support the horizontal rotation shaft 7, and a first supporting arm 14 is mounted on the vertical shaft 6. The first supporting arm 14 constitutes a part of the supporting unit of the horizontal rotation shaft 7 and it is extended in the upward direction in parallel to the horizontal rotation shaft 7. A horizontal tilt sensor 15 is mounted on an upper portion of the first supporting arm 14.

The horizontal tilt sensor 15 projects a detecting light toward a reflection mirror portion of the horizontal angle encoder plate 9, and a reflection light from the reflection mirror portion is received at a photodetection unit. By comparing a photodetecting position of the reflection light on the photodetection unit with a standard photodetecting position, a deviation is determined. Based on an amount of deviation and on a direction of the deviation, the tilting and the undulation of the horizontal angle encoder plate 9 at the reflecting position and the unsteadiness of the rotation of the horizontal rotation shaft are detected.

The body tube unit 4 is accommodated in a recessed portion of the frame unit 3. The body tube unit 4 has vertical rotation shafts 16 and 17 protruding in the horizontal direction, and the vertical rotation shafts 16 and 17 are rotatably supported on the frame unit 3. An elevation driven gear 18 is engaged with one of the vertical rotation shafts (i.e. the vertical rotation shaft 16), and an elevation angle encoder 19 is disposed on the other vertical rotation shaft 17.

It is so designed that the elevation driven gear 18 is rotated by an elevation angle motor 21. By the driving action of the elevation angle motor 21, the body tube unit 4 is rotated in the vertical direction via the elevation driven gear 18 and the vertical rotation shafts 16 and 17.

A vertical flange 22 is engaged on the vertical rotation shaft 17, and an elevation angle encoder plate 23 is mounted concentrically with the vertical rotation shaft 17 on the vertical flange 22. An encoder sensor (not shown) is disposed at a position to face to the elevation angle encoder plate 23. The encoder sensor and the elevation angle encoder plate 23 make up together the elevation angle encoder 19.

A mirror surface is formed on a peripheral edge of the elevation angle encoder plate 23, thus constituting a reflection portion. An elevation tilt sensor 24 (to be described later) is mounted so that it faces to the reflection portion.

At a position as required on an inner wall of the frame unit 3, a second supporting arm 25 extended in the horizontal direction is provided, and the elevation tilt sensor 24 is mounted on the second supporting arm 25. The frame unit 3 is a supporting unit to support the vertical rotation shaft 17, and the second supporting arm 25 is a part of the supporting unit of the vertical rotation shaft 17.

The elevation tilt sensor 24 projects a detecting light to a reflection mirror portion of the elevation angle encoder plate 23, and a reflection light from the reflection mirror portion is received at a photodetection unit. By comparing the photodetecting position of the reflection light on the photodetection unit with a standard photodetecting position, a deviation is determined. Based on an amount of deviation and on a direction of the deviation, the tilting and the undulation of the elevation encoder plate 23 at the reflecting point and the unsteadiness of rotation of the vertical rotation shaft 17 are detected.

A distance measuring unit (not shown) is accommodated inside the body tube unit 4, and the distance measuring unit comprises a distance measuring light emitting unit, a projection light optical system, a photodetection light optical system, a photodetection unit, a distance calculating unit, etc. A control unit 26 is disposed inside the frame unit 3. The distance measuring unit is driven by the control unit 26, and a distance is measured. Also, angle signals from the horizontal angle encoder 13 and the elevation angle encoder 19 are inputted to the control unit 26, and a horizontal angle and an elevation angle are measured.

The driving of the horizontal angle motor 12 and the driving of the elevation angle motor 21 are controlled by the control unit 26. From the horizontal tilt sensor 15, a tilt angle detected by the horizontal tilt sensor 15 is inputted to the control unit 26. From the elevation tilt sensor 24, a tilt angle detected by the elevation tilt sensor 24 is inputted to the control unit 26. Based on signals from the horizontal tilt sensor 15 and the elevation tilt sensor 24, the control unit 26 compensates the results of measurements on the distance, the horizontal angle and the elevation angle.

Now, referring to FIG. 2 and FIG. 3, description will be given on the horizontal tilt sensor 15 and the elevation tilt sensor 24. Because the horizontal tilt sensor 15 and the elevation tilt sensor 24 have the same configuration, a description will be given below only on the horizontal tilt sensor 15.

Figure 2:
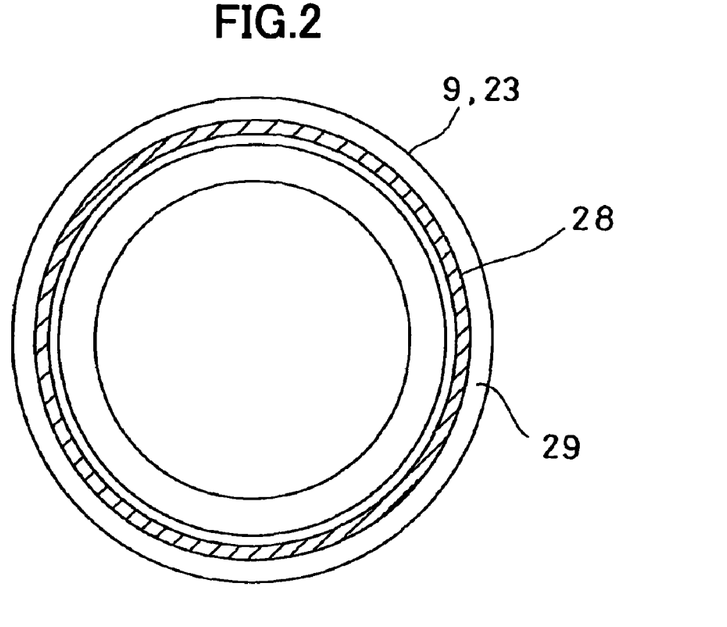
FIG. 2 is a plan view of a horizontal angle encoder plate and an elevation angle encoder plate to be used in the embodiment of the invention.

FIG. 2 shows a lower surface of the horizontal angle encoder plate 9. On the horizontal angle encoder plate 9, an angle pattern 28 as an encoder is formed in the ring-like shape. A mirror surface is formed on a peripheral edge of the horizontal angle encoder plate 9, and a reflection mirror portion 29 is formed on the peripheral edge.

Figure 3:
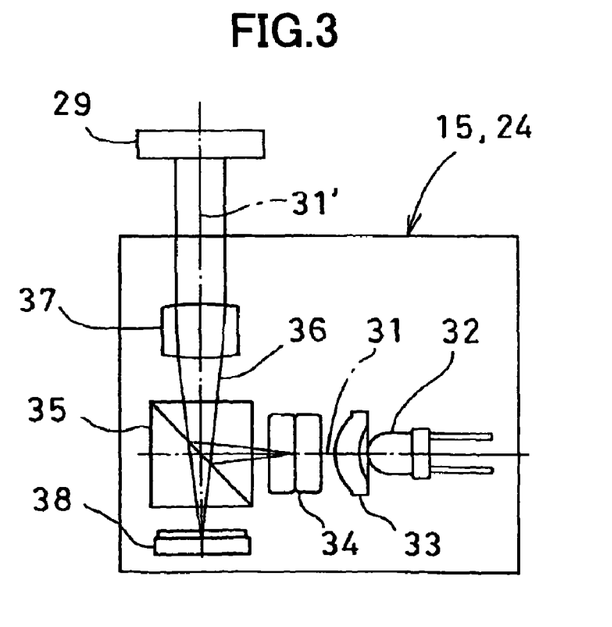
FIG. 3 is a schematical drawing to show a horizontal tilt sensor and an elevation tilt sensor to be used in the embodiment.

FIG. 3 shows a basic arrangement of the horizontal tilt sensor 15. The horizontal tilt sensor 15 has a detecting light projecting optical axis 31. On the detecting light projecting optical axis 31, a light-emitting element (LED) 32, a condenser lens 33, a pattern 34, and a half-mirror (beam splitter) 35 are provided. The half-mirror 35 deflects the detecting light projecting optical axis 31 in the perpendicular direction, and a part of the detecting light 36 is reflected along a deflected light projecting optical axis 31'. On the deflected light projecting optical axis 31', a condenser lens 37 is disposed, and the deflected light projecting optical axis 31' is arranged to run perpendicularly to the reflection mirror portion 29. On the deflected light projecting optical axis 31, which passed through the half-mirror 35, a profile sensor 38 is provided. If a reflection surface of the reflection mirror portion 29 runs accurately in the perpendicular direction to the deflected light projection optical axis 31', a reflection light optical axis of the detecting light 36 reflected at the reflection mirror portion 29 concurs with the deflected light projecting optical axis 31'. On the other hand, if the reflection surface of the reflection mirror portion 29 is tilted with respect to the vertical direction, the deflection of the reflection light optical axis occurs with respect to the deflected light projecting optical axis 31'. By determining this deflection, the tilting of the reflection surface can be detected.

The profile sensor 38 is a CCD sensor or a CMOS sensor, for instance, and it has a photodetecting surface, which is spread two-dimensionally, and it is an aggregate of a multiple of pixels. Each pixel emits a photodetection signal. Through a processing of the photodetection signal, for instance, a position information of a barycenter of a spot light received can be obtained. The profile sensor 38 is used, for instance, which is in a square shape with one side of 1.9 mm in length and has pixels in number of 256×256 and pixel pitch of 7.8 μm.

Figure 4:
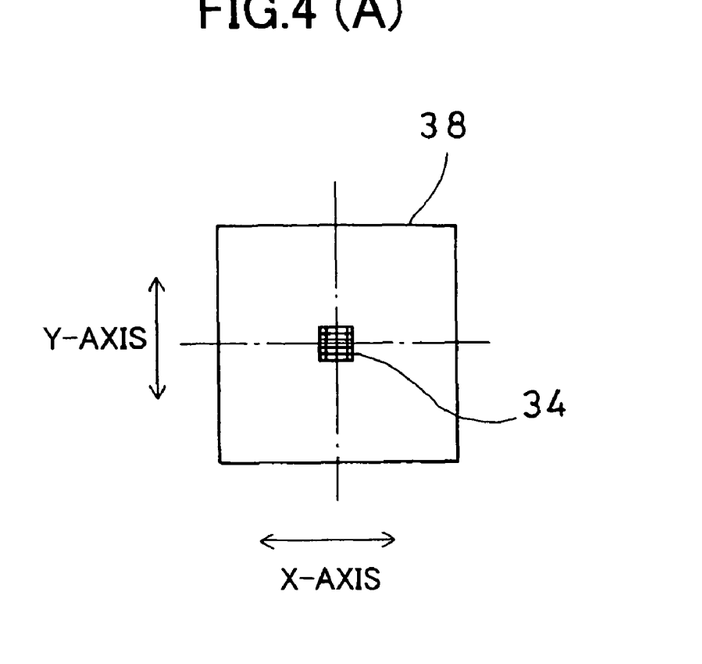
FIG. 4 represents drawings to show a relation between a profile sensor to be used in the embodiment and a pattern projected on the profile sensor.

As shown in FIG. 4(A) and FIG. 4(B), a X-Y coordinates are set up on the photodetecting surface, for instance. X-coordinate and Y-coordinate of the pixel are specified, and a standard position of the profile sensor 38 is defined as a condition where the pattern to be received is at an intersection O of the X-coordinate and the Y-coordinate, i.e. the condition shown in FIG. 4(A). As shown in FIG. 4(B), when the pattern of each pixel on the photodetecting surface is deviated from the intersection O, an amount of displacement of the pattern with respect to the intersection O is specified. A pattern 34 in FIG. 4 indicates a part of the pattern. An example of the pattern is described in JP-A-2007-127628.

A detecting light 36 is emitted from the light emitting element 32. The detecting light 36 passes through the pattern 34, and it is then reflected by the half-mirror 35 and is projected to the reflection mirror portion 29. The detecting light is reflected by the reflection mirror portion 29, and the reflected detecting light 36 passes through the half-mirror 35 and is projected on the profile sensor 38.

When the reflection surface of the reflection mirror portion 29 is in a perfectly perpendicular direction with respect to the deflecting light projecting optical axis 31', no deviation occurs between the optical axis of the detecting light 36 reflected by the reflection mirror portion 29 and the deflected light projecting optical axis 31', and the pattern 34 projected on the profile sensor 38 concurs with the origin O of the coordinate axis of the profile sensor 38 (see FIG. 4(A)). On the other hand, if the reflection surface of the reflection mirror portion 29 is tilted with respect to the deflected light projecting optical axis 31', the pattern 34 projected on the profile sensor 38 is deviated from the origin O.

By the amount of deviation, an amount of the tilting on the reflection surface can be detected, and by the direction of the deviation, a tilting direction of the reflection surface can be detected. When the horizontal angle encoder plate 9 is rotated and the deviation of the pattern on the profile sensor 38 is detected at each predetermined step of angle (e.g. 1°), an amount of the tilting and a tilting direction over the total circumference of the reflection mirror portion 29 can be detected.

When the deviation of the pattern is detected, a deviation between a photodetection signal of the pattern received by the profile sensor 38 and a signal obtained when the pattern is projected to the origin O or to a standard position is determined. Based on the deviation of the signals, the deviation between the photodetecting position of the pattern 34 and the origin O or the standard position is obtained as a position deviation. To detect the photodetecting position by using the profile sensor, the following methods are known: a method to calculate a barycenter where a spot beam is received, a method to read a deviation of the photodetection signal by applying the pattern, and other methods.

In the case of the horizontal tilt sensor 15, the detecting light projecting optical axis 31 runs in the horizontal direction, and the deflected light projecting optical axis 31' runs in the vertical direction.

Figure 5:
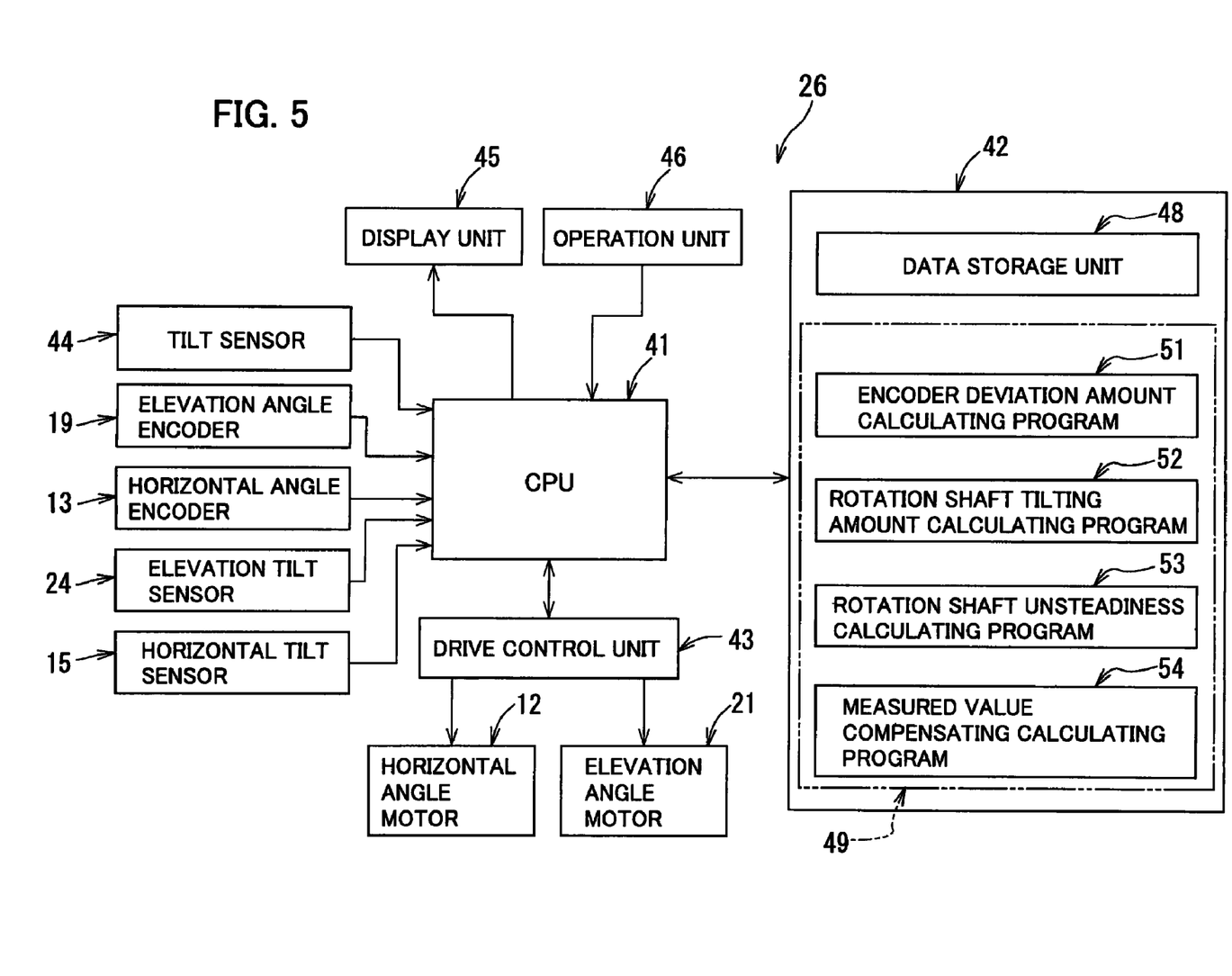
FIG. 5 is a control block diagram of the embodiment.

Next, referring to FIG. 5, a description will be given on the control unit 26.

The control unit 26 comprises an arithmetic unit 41 typically represented by a CPU, a storage unit 42 incorporated with an external storage device such as a semiconductor memory or HDD, and a drive control unit 43, etc. The horizontal angle encoder 13, the elevation angle encoder 19, the horizontal tilt sensor 15, the elevation tilt sensor 24, a tilt sensor 44, a display unit 45, and an operation unit 46 are electrically connected to the arithmetic unit 41. The horizontal angle motor 12 and the elevation angle motor 21 are electrically connected to the drive control unit 43.

The horizontal angle encoder 13 detects a horizontal angle of the distance measuring light optical axis, and the elevation angle encoder 19 detects an elevation angle of the distance measuring light optical axis. The horizontal angle and the elevation angle thus detected are inputted to the arithmetic unit 41. The horizontal tilt sensor 15 detects the unsteadiness of the rotation of the vertical shaft 6 when the frame unit 3 is rotated in the horizontal direction, and the result of the detection is inputted to the arithmetic unit 41. The elevation tilt sensor 24 detects the unsteadiness of the rotation of the vertical rotation shaft 17 when the body tube unit 4 is rotated in the vertical direction, and the result of detection is inputted to the arithmetic unit 41.

The storage unit 42 has a data storage unit 48 and a program storage unit 49.

A measurement data of the undulation of the reflection mirror portion 29 of the horizontal angle encoder plate 9 and a measurement data of the tilting of the horizontal angle encoder plate 9 with respect to the horizontal rotation shaft 7 as checked by the precision inspection at the factory or elsewhere, are associated with the rotation angle of the horizontal angle encoder plate 9 and are stored in the data storage unit 48.

Similarly, the measurement data of the undulation on the reflection mirror portion 29 of the elevation angle encoder plate 23 and the measurement data of the tilting of the elevation angle encoder plate 23 with respect to the vertical rotation shaft 17 are associated with the rotation angle of the elevation angle encoder plate 23 and are stored in the data storage unit 48.

So as to perform the measurement various types of programs are stored in the program storage unit 49. These programs include: a sequence program (not shown) to drive and control the distance measuring unit (not shown), the horizontal angle motor 12, the elevation angle motor 21, etc., an encoder deviation amount calculating program 51, a rotation shaft tilting amount calculating program 52, a rotation shaft unsteadiness calculating program 53, a measured value compensating program 54, etc.

The arithmetic unit 41 and the encoder deviation amount calculating program 51 fulfill the function as an encoder deviation amount calculating means. The arithmetic unit 41 and the rotation shaft tilting amount calculating program 52 fulfill the function as the rotation shaft tilting amount calculating means. The arithmetic unit 41 and the rotation shaft unsteadiness calculating program 53 fulfill the function as the means for calculating the unsteadiness of the rotation shaft. The arithmetic unit 41 and the measured value compensating program 54 fulfill the function as the measurement value compensating means.

Next, description will be given on the operation of the present invention.

First, measurement is made on mirror surface irregularities (deflection and distortion of mirror surface) on the reflection mirror portion 29 itself of each of the horizontal angle encoder plate 9 and the elevation angle encoder plate 23.

In the measurement on each of the horizontal angle encoder plate 9 itself and the elevation angle encoder plate 23 itself, the measurement is performed under the condition where high precision is maintained so that no core deflection occurs and that the horizontal angle encoder plate 9 and the elevation angle encoder plate 23 run perpendicularly to the rotation center.

In the measurement of mirror surface irregularities caused by the undulation on the reflection surface, a measuring device is used, which has an arrangement similar to that of the horizontal tilt sensor 15 as shown in FIG. 3. The detecting light reflected by the reflection surface is detected by the profile sensor, and deviation between the photodetecting position and the standard position is determined. In this case, it is preferable that the measuring device used for the measurement of mirror surface irregularities is arranged in the same relation and in the same arrangement as the horizontal angle encoder plate 9 and the horizontal tilt sensor 15 mounted on the surveying instrument main unit 1. In this case, the measurement data can be immediately used as the compensation data for the surveying instrument main unit 1.

Figure 6:
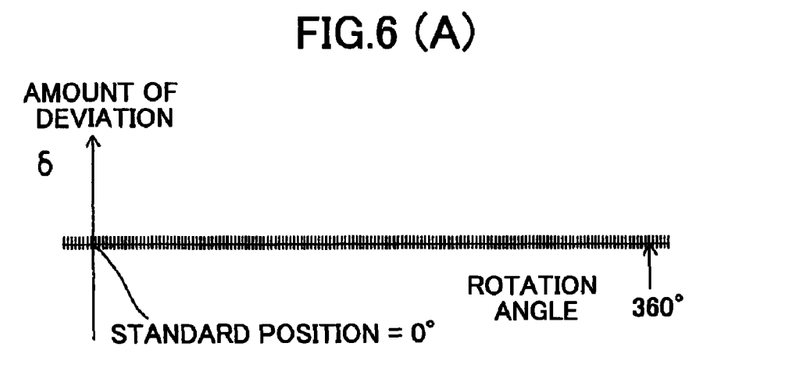
FIG. 6(A) shows a case where there are no mirror surface irregularities.
FIG. 6(B) represents a case where there are the mirror surface irregularities.

FIG. 6 shows the results of measurement on mirror surface irregularities. When the reflection mirror portion 29 is rotated by one turn, the photodetecting position remains in concurrence with the standard position if no mirror surface irregularities exist (see FIG. 4(A) and FIG. 6(A)), and the amount of deviation cannot be detected.

When there are mirror surface irregularities on the reflection mirror portion 29, the amount of deviation is detected (see FIG. 4(B) and FIG. 6(B)). The amount of deviation changes in the cycle of one rotation. The amount of deviation is measured with a rotating position (rotation angle) of the reflection mirror portion 29, and the rotation angle and the amount of deviation are associated with each other. The measurement data of the mirror surface irregularities thus obtained is stored in advance in the data storage unit 48 via the operation unit 46 as a preset compensation data.

The horizontal angle encoder plate 9 and the elevation angle encoder plate 23 which have measured as a unit itself are mounted on the horizontal rotation shaft 7 and the vertical rotation shaft 17 respectively, and the measurement is performed by the surveying instrument main unit 1.

When the horizontal rotation shaft 7 and the vertical rotation shaft 17 are rotated during the process of measurement, the tilting of the reflection surface of the reflection mirror portion 29 is detected by the horizontal tilt sensor 15 and the elevation tilt sensor 24. The tilting of the reflection surface is determined as a tilting of the deflected light projecting optical axis 31' (see FIG. 3) as described above, i.e. as a deviation of the pattern 34 from the origin O (see FIG. 4(B)). As the result of the measurement, the amount of deviation due to the tilting to correspond to the angle is stored in the storage unit. Or, the rotation shaft is rotated by 360° or more prior to the measurement during the surveying operation, and the amount of deviation determined at the profile sensor 38 may be stored in each operation and may be used as an amount of the compensation.

In addition to the deviation caused by mirror surface irregularities of the reflection mirror portion 29 itself as measured at factory or elsewhere on the reflection mirror portion 29, the amount of deviation includes: the unsteadiness of rotation of the horizontal rotation shaft 7 with respect to the vertical shaft 6, the unsteadiness of rotation when the vertical rotation shaft 17 is rotated, and further, the tilting of the horizontal encoder plate 9 with respect to the rotation center, and deviation caused by the tilting of the elevation angle encoder plate 23 with respect to the rotation center.

Therefore, in the deviation of the pattern 34 on the profile sensor 38 detected by the horizontal tilt sensor 15 and the elevation tilt sensor 24 respectively, the following types of deviation are included: deviation $\delta 1$ caused by mirror surface irregularities of the reflection mirror portion 29, deviation $\delta 2$ caused by the tilting of the reflection mirror portion 29 with respect to the rotation center, and deviation $\delta 3$ caused by the unsteadiness of rotation during the rotation of the horizontal rotation shaft 7 and the vertical rotation shaft 17. The deviation $\delta 1$ is stored in the data storage unit 48 in advance as a preset compensation data.

First, based on the result of detection by the horizontal tilt sensor 15, description will be given on the compensation of the horizontal angle.

Of the types of the deviation detected by the horizontal tilt sensor 15, each of a deviation $\delta H1$ and a deviation $\delta H2$ appears as an error of horizontal angle and elevation angle directly detected by the horizontal angle encoder 13. The deviation $\delta H1$ and the deviation $\delta H2$ are not accompanied with deflection of the distance measuring light optical axis. With regard to the deviation $\delta H3$, if the axis of rotation in the vertical direction is taken as Z-axis, it has a component in X direction (directions of the rotation shafts 16 and 17 in the horizontal direction in FIG. 1) and Y direction (a direction perpendicular to paper surface in FIG. 1). The deviation in X direction appears as an error of angle in the horizontal direction, and the deviation in Y direction appears as an error of angle in the elevation direction. Therefore, the deviation δH3 causes measurement error and deflection of optical axis not only in the direction of the horizontal angle but also in the direction of elevation angle. The errors may not be limited to the measurement errors but may include errors in horizontal distance and vertical distance (relative height) calculated from the result of the distance measurement.

In this respect, in the compensation of the horizontal angle and the compensation of the results of the distance measurement, the deviation δH1 and the deviation δH2 must be treated separately from the deviation δH3. In case the deviation occurs in the direction of X-axis and Y-axis respectively (see FIG. 4(b)), the compensation should be performed on X-component and Y-component respectively.

By the encoder deviation amount calculating program 51 as given above, a deviation to correspond to the horizontal rotation angle is detected based on the detection result by the horizontal angle encoder 13 and the detection result from the horizontal tilt sensor 15. Further, by the rotation shaft tilting amount calculating program 52, the tilting of the rotation shaft obtained by subtracting the deviation δH1 from the deviation δ is calculated based on the preset compensation data (the deviation δ) stored in the data storage unit 48. In the deviation thus obtained, the deviation δH2 and the deviation δH3 are included. When the horizontal angle encoder plate 9 runs perpendicularly to the rotation center, the deviation δH2 is 0, and the deviation obtained by the calculation is the deviation δH3. Also, when the horizontal angle encoder plate 9 is tilted with respect to the rotation axis, the deviation δH2 is included. But because the deviation δH2 appears periodically for each turn, the deviation δH2 can be eliminated by the calculation.

Figure 7:
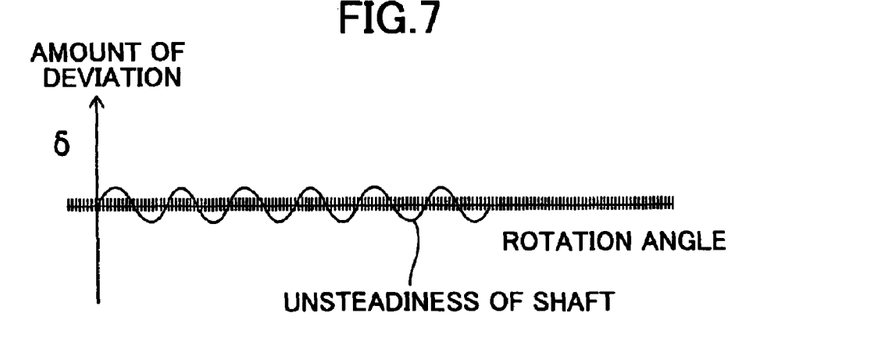
FIG. 7 represents drawing to show an obtained unsteadiness of a rotation shaft by an elimination of the deviation δ caused by the mirror surface irregularities according to signals from the horizontal tilt sensor and the elevation tilt sensor.

The unsteadiness of the rotation shaft can be calculated by the calculating program 53. Further, the deviation δH2 is calculated from the tilting of the rotation shaft obtained by the rotation shaft tilting amount calculating program 52, and the deviation δH3 can be separately extracted (see FIG. 7).

Based on the deviations δH1, δH2 and δH3 thus obtained, the elevation angle measured by the elevation angle encoder 19 is compensated. Further, the deflection of the distance measuring light optical axis is calculated. From the results of the distance measurement, the values of horizontal distance and vertical distance (relative height) calculated from the result of the distance measurement are also compensated.

The horizontal tilt sensor 15 relatively detects the unsteadiness of rotation of the frame unit 3 with respect to the rotation shaft 6 and the undulation of the reflection mirror portion 29 of the horizontal angle encoder plate 9. No matter in which posture the surveying instrument main unit 1 may be installed, the relative unsteadiness and the deflection of the optical axis of rotation to the surveying instrument main unit 1 can be accurately detected, and the results of measurement can be compensated with high accuracy.

The same applies to the case where the elevation angle is compensated based on the results of detection by the elevation tilt sensor 24.

By the encoder deviation amount calculating program 51, a deviation δV to correspond to the elevation rotation angle can be detected based on the detection results from the elevation angle encoder 19 and based on the detection results from the elevation tilt sensor 24.

By the rotation shaft tilting amount calculating program 52, the tilting of the rotation shaft can be calculated based on the preset compensation data and based on the deviation δV1 stored in the data storage unit 48. By the program 53 for calculating the unsteadiness of the rotation shaft, the values of the deviation δV2 and the deviation δV3 are calculated, and the unsteadiness of the vertical rotation shaft 17 is calculated.

Based on the values of the deviations δV1, δV2 and δV3 thus obtained, the elevation angle measured by the elevation angle encoder 19 is compensated. Further, the deviation of the distance measuring light optical axis is calculated, and the result of the distance measurement is also compensated.

With regard to the elevation angle, the deviation δV detected by the elevation tilt sensor 24 is a deviation relating to the vertical rotation shaft 17 with respect to the frame unit 3. In this case, also, the relative unsteadiness of rotation to the surveying instrument main unit 1 and the deflection of optical axis can be accurately detected regardless of the posture of the frame unit 3, and the measurement results can be compensated with high accuracy. The elevation angle can be obtained by taking the deviation of the rotation shaft of the angle in the horizontal direction into account. As a result, more precise measurement can be made than in the case where the falling of the rotation shaft in the vertical direction is taken into account. Also, because the horizontal angle and the elevation angle can be compensated, it is possible to compensate three-dimensional coordinates of the measuring point obtained as the result of the distance measurement and angle measurement.

Figure 8:
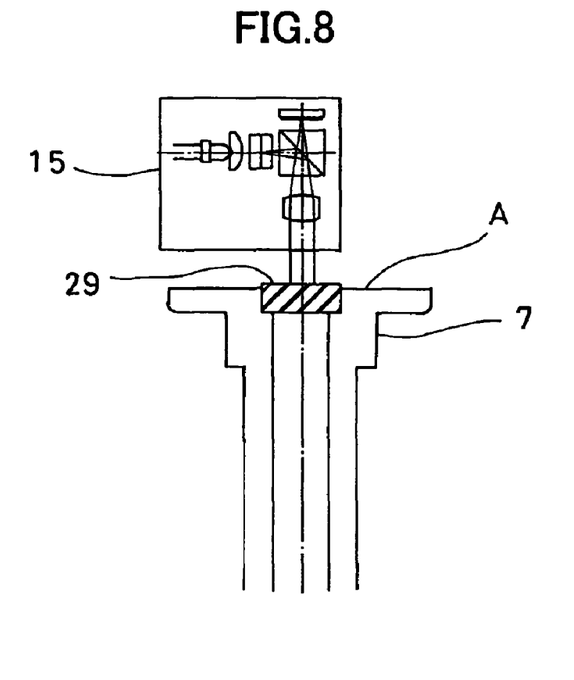
FIG. 8 is a partial view to show the horizontal tilt sensor in a second embodiment of the invention.
Figure 9:
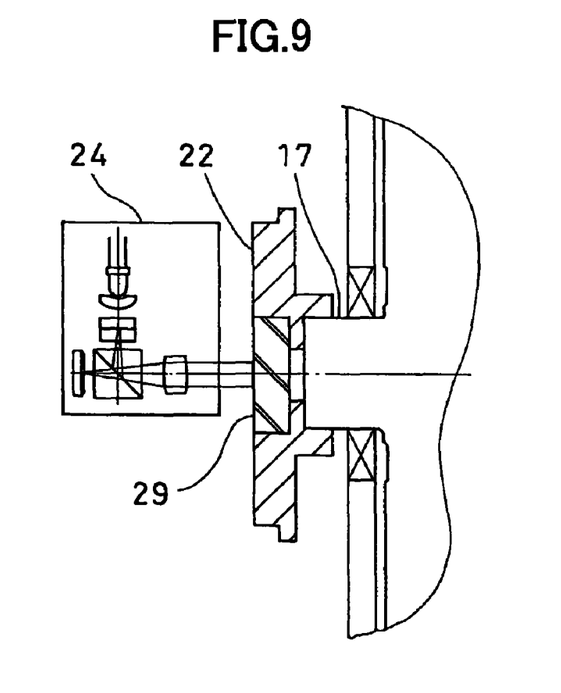
FIG. 9 is a partial view to show the elevation tilt sensor in the second embodiment.

FIG. 8 and FIG. 9 each represents a second embodiment of the invention. In the second embodiment, the reflection mirror portion 29 is each disposed at the rotation center of the horizontal rotation shaft 7 and the vertical rotation shaft 17.

The reflection mirror portion 29 is disposed at the rotation center, and the detecting light projecting optical axis 31 of the horizontal tilt sensor 15 and the elevation tilt sensor 24 are set in such manner that it concurs with the rotation center. By setting the detecting light projecting optical axis 31 to concur with the rotation center, no influence is exerted from the undulation of the reflection mirror portion 29, and the deviation amount caused by the tilting of the reflection surface and by the unsteadiness of rotation can be read from the measurement by the profile sensor. By eliminating the error caused by the tilting of reflection surface with one-turn cycle, the deviation amount cause by the unsteadiness of rotation can be estimated and compensated.

Figure 10:
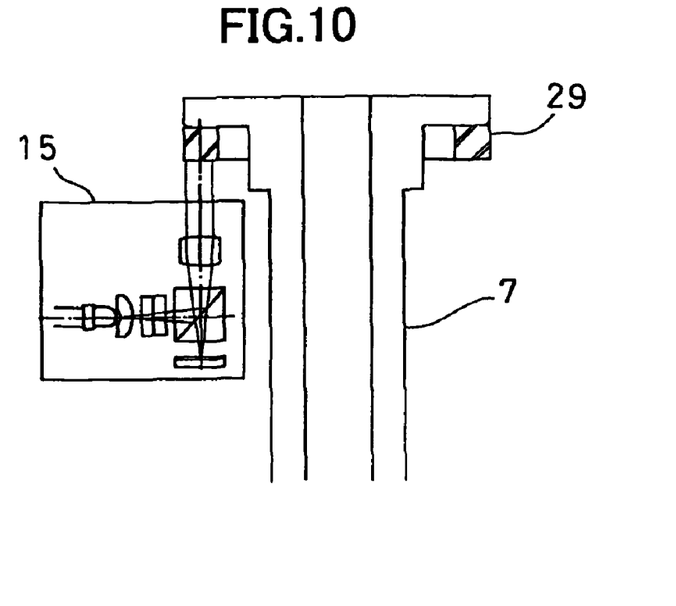
FIG. 10 is a partial view to show the horizontal tilt sensor in a third embodiment of the invention.
Figure 11:
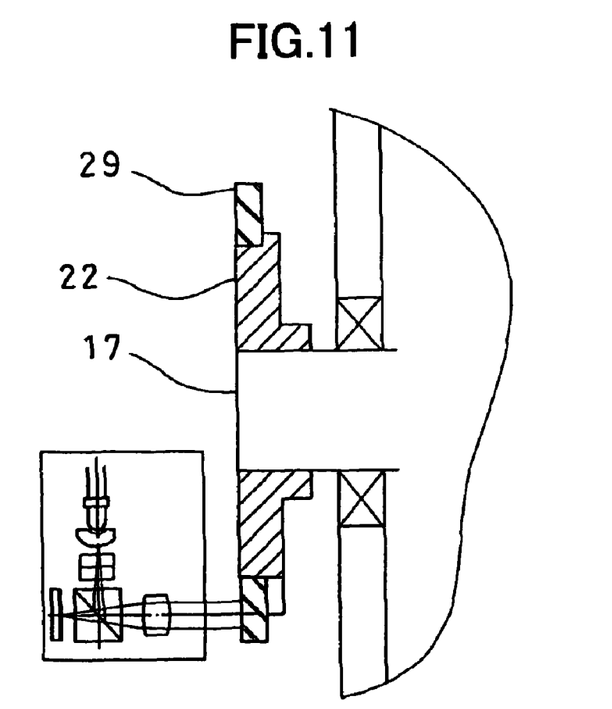
FIG. 11 is a partial view to show the elevation tilt sensor in the third embodiment.

FIG. 10 and FIG. 11 each represents a third embodiment of the invention. The reflection mirror portions 29 in the ring-like shape are provided separately from the horizontal angle encoder plate 9 and the elevation angle encoder plate 23. By arranging the reflection mirror portions 29 separately from the horizontal angle encoder plate 9 and the elevation angle encoder plate 23, it is possible to make the thickness of the reflection mirror portion 29 thicker and to reduce the undulation of the reflection surface.

In the embodiments as described above, the reflection mirror portion is disposed on the rotating unit and the tilt sensor is arranged on the supporting unit, while it is needless to say that the tilt sensor may be provided on the rotating unit and the reflection mirror portion may be arranged on the supporting unit.

What is claimed is:

1. A surveying instrument, comprising a rotating unit having a rotating shaft, a supporting unit to rotatably support the rotating unit around a center line of a rotating shaft via the rotating shaft, a reflection mirror portion provided concentrically with the rotating shaft and for rotating together with said rotating shaft, tilt sensor arranged on the supporting unit and for projecting a detecting light toward the reflection mirror portion perpendicularly and for detecting a relative tilting of reflection surface of said reflection mirror portion with respect to said supporting unit by receiving said detecting light reflected by the reflection mirror portion when said rotating shaft is rotated, and a control unit for calculating an unsteadiness of rotation of the rotating unit based on a signal from the tilt sensor.

2. A surveying instrument according to claim 1, wherein said control unit has a storage unit where data of an undulation in circumferential direction of said reflection surface of the reflection mirror portion measured in advance is stored, and said control unit removes said undulation of said reflection surface based on signals from the tilt sensors and calculates said unsteadiness of rotation of said rotating units based on said data of the undulation.

3. A surveying instrument according to claim 1 or 2, wherein there is provided an encoder for detecting a relative rotation angle between the rotating unit and the supporting unit, and the control unit compensates the angle measured by said encoder based on said unsteadiness of rotation obtained by a calculation.

4. A surveying instrument according to claim 3, further comprising rotating units each having a vertical shaft, a horizontal rotating unit rotating around said vertical shaft, a horizontal shaft and a vertical rotating unit rotating around said horizontal shaft, wherein said tilt sensors have a horizontal tilt sensor for detecting said unsteadiness of rotation of said horizontal rotating unit and a vertical tilt sensor for detecting said unsteadiness of rotation of said vertical rotating unit.

5. A surveying instrument according to claim 1 or 2, further comprising rotating units each having a vertical shaft, a horizontal rotating unit rotating around said vertical shaft, a horizontal shaft and a vertical rotating unit rotating around said horizontal shaft, wherein said tilt sensors have a horizontal tilt sensor for detecting said unsteadiness of rotation of said horizontal rotating unit and a vertical tilt sensor for detecting said unsteadiness of rotation of said vertical rotating unit.

6. A surveying instrument according to claim 1 or 2, wherein said rotating unit is a body tube unit for accommodating a distance measuring unit, and said control unit performs a calculation to compensate at least one of horizontal distance and vertical distance based on said unsteadiness of rotation obtained by said calculation and based on the value of a distance measurement measured by the distance measuring unit.

7. A surveying instrument according to claim 1 or 2, wherein said reflection mirror portion is disposed on rotation center line of said rotating units.

8. A surveying instrument according to claim 1 or 2, wherein said reflection mirror portion is designed in ring-like shape and is disposed concentrically with the rotation center line of the rotating units.

9. A surveying instrument according to claim 1 or 2, wherein said reflection mirror portion is formed in ring-like shape on an encoder plate of an encoder.

10. A surveying compensation method in a surveying instrument, which comprises a rotating unit having a rotating shaft, a distance measuring unit accommodated in the rotating unit, an angle detector for detecting an angle of the rotating unit, a supporting unit to rotatably support the rotating unit around a center line of a rotating shaft via the rotating shaft, a reflection mirror portion provided concentrically with the rotating shaft and for rotating together with said rotating shaft, a tilt sensor arranged on the supporting unit and for projecting a detecting light toward the reflection mirror portion perpendicularly and for detecting a relative tilting of reflection surface of said reflection mirror portion with respect to said supporting unit by receiving said detecting light reflected by the reflection mirror portion when said rotating shaft is rotated, comprising: a step of measuring an undulation by rotating said reflection surface of the reflection mirror portion itself in circumferential direction; a step of detecting the tilting according to a rotation of said reflection surface of said reflection mirror portion under the condition that said tilt sensor is mounted on said supporting unit; a step of calculating an unsteadiness of rotation by removing said undulation of said reflection surface from the tilting of said reflection surface; and a step of compensating at least one of: rotation angle of said rotating unit measured based on said undulation and on said unsteadiness of rotation, or three-dimensional coordinates calculated from the value of said rotation angle and the result of the distance measurement obtained at the distance measuring unit.

11. The surveying compensation method of claim 10, wherein said compensating step compensates both said rotation angle of said rotating unit measured based on said undulation and on said unsteadiness of rotation, and said three-dimensional coordinates calculated from the value of said rotation angle and the result of the distance measurement obtained at the distance measuring unit.

* * * * *